United States Patent
Lee et al.

(10) Patent No.: US 8,098,348 B2
(45) Date of Patent: Jan. 17, 2012

(54) LIGHT-GUIDE PLATE HAVING A PROTRUSION PATTERN AND DISPLAY APPARATUS HAVING THE SAME

(75) Inventors: Sang-Hoon Lee, Cheonan-si (KR);
Jin-Sung Choi, Cheonan-si (KR);
Byung-Yun Joo, Seoul (KR);
Min-Young Song, Seoul (KR);
Dong-Kwan Kim, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 276 days.

(21) Appl. No.: 12/049,774

(22) Filed: Mar. 17, 2008

(65) Prior Publication Data

US 2008/0239204 A1 Oct. 2, 2008

(30) Foreign Application Priority Data

Mar. 30, 2007 (KR) ........................ 10-2007-0031700

(51) Int. Cl.
*G02F 1/1335* (2006.01)
*G09F 13/04* (2006.01)
*G09F 13/08* (2006.01)
*F21V 7/04* (2006.01)

(52) U.S. Cl. .......................... 349/65; 362/97.2; 362/620

(58) Field of Classification Search .............. 349/62–67; 362/97.1–97.3, 620, 626
See application file for complete search history.

(56) References Cited

U.S. PATENT DOCUMENTS

| 4,673,254 | A | * | 6/1987 | Kato et al. | 359/599 |
| 6,048,071 | A | * | 4/2000 | Sawayama | 362/603 |
| 6,049,649 | A | * | 4/2000 | Arai | 385/133 |
| 6,825,895 | B2 | * | 11/2004 | Nakano et al. | 349/63 |
| 2005/0157516 | A1 | * | 7/2005 | Chen et al. | 362/555 |
| 2005/0180169 | A1 | * | 8/2005 | Saitoh et al. | 362/620 |
| 2006/0007302 | A1 | * | 1/2006 | Numata et al. | 348/71 |
| 2008/0043170 | A1 | * | 2/2008 | Ikeda | 349/65 |

FOREIGN PATENT DOCUMENTS

| JP | 2006-128072 | 5/2006 |
| KR | 1020060013318 | 2/2006 |
| KR | 1020060051190 | 5/2006 |

OTHER PUBLICATIONS

English Abstract for Publication No. 102006003318.
English Abstract for Publication No. 2006-128072.
English Abstract for Publication No. 1020060051190.

* cited by examiner

*Primary Examiner* — Mark Robinson
*Assistant Examiner* — Michael Inadomi
(74) *Attorney, Agent, or Firm* — F. Chau & Associates, LLC

(57) ABSTRACT

A light-guide plate includes a base plate, first protrusion patterns and second protrusion patterns. The first protrusion patterns are formed on a left portion of an upper surface of the base plate with respect to a central line of the upper surface. The first protrusion patterns have a cross-section of a trapezoidal shape which has a top and a bottom parallel with each other and first and second inclined sides inclined at different angles with respect to the bottom side. The second protrusion patterns are formed on a right portion of the upper surface with respect to the central line. A cross-section of the second protrusion patterns have the trapezoidal shape and disposed substantially symmetrical to the first protrusion patterns with respect to the central line.

35 Claims, 12 Drawing Sheets

LIGHT-GUIDE PLATE HAVING A PROTRUSION PATTERN AND DISPLAY APPARATUS HAVING THE SAME

CROSS-REFERENCE TO RELATED APPLICATIONS

This application claims priority under 35 U.S.C. §119 to Korean Patent Application No. 2007-31700, filed on Mar. 30, 2007 in the Korean Intellectual Property Office (KIPO), the contents of which are herein incorporated by reference in their entirety.

BACKGROUND OF THE INVENTION

1. Field of the Invention

The present invention relates to a light-guide plate and a display apparatus having the light-guide plate. More particularly, the present invention relates to a light-guide plate used for a display apparatus and a display apparatus having the light-guide plate, which is capable of improving an image display quality.

2. Description of Related Art

A liquid crystal display (LCD) apparatus is typically thinner and lighter than a cathode ray tube apparatus (CRT) or a plasma display panel (PDP). In addition, the LCD apparatus typically has a lower driving voltage and lower power consumption than the CRT or the PDP.

An LCD panel displaying an image does not generate light by itself. Thus, the LCD panel is typically implemented in combination with a backlight assembly providing the LCD panel with light.

The backlight assembly employed in a notebook computer or a monitor includes a lamp generating light, a light-guide plate guiding the light generated by the lamp toward the liquid crystal panel and optical sheets, such as a diffusion sheet, a prism sheet, etc. A prism light-guide plate including a plurality of triangular prism patterns formed on upper and lower surfaces thereof may be used in place of a number of the optical sheets.

However, in a backlight assembly using the prism light-guide plate, a viewing angle may be narrowed as compared to a backlight assembly using the optical sheets since the prism light-guide plate emits light substantially perpendicular to an upper surface of the prism light-guide plate.

SUMMARY OF THE INVENTION

A light-guide plate according to an exemplary embodiment of the present invention includes a base plate, first protrusion patterns and second protrusion patterns. The first protrusion patterns are formed on a left portion of an upper surface of the base plate with respect to a central line of the upper surface. The first protrusion patterns have a cross-section of a trapezoidal shape which has a top and a bottom substantially parallel with each other and first and second inclined sides inclined at different angles with respect to the bottom. The second protrusion patterns are formed on a right portion of the upper surface with respect to the central line. A cross-section of the second protrusion patterns having the trapezoidal shape and disposed substantially symmetrical to the first protrusion patterns with respect to the central line.

Each of the first protrusion patterns may include the first inclined side, the top and the second inclined side. The first inclined side is extended from the upper surface of the base plate and inclined toward the central line. The top is extended from the first inclined side toward the central line. The top is substantially parallel with the upper surface of the base plate. The second inclined side is extended from the top to the upper surface of the base plate.

Angles between the first inclined side and the upper surface may be variable according to a distance from the central line. The angles between the first inclined side and the upper surface may increase as the distance from the central line increases.

The second inclined side may be perpendicularly expended to the upper surface of the base plate. Alternatively, the second inclined side may be inclined away from the central line with respect to the upper surface of the base plate.

An angle between the second inclined side and the upper surface may be larger than an angle between the first inclined side and the upper surface.

The first protrusion patterns may have variable widths according to a distance from the central line. The widths of the first protrusion patterns may increase as a distance from the central line increases.

The first protrusion patterns may be spaced apart from one another by a predetermined distance. Distances between adjacent first protrusion patterns may be variable according to a distance from the central line. The spacing distances between adjacent first protrusion patterns may increase as a distance from the central line increases.

The light-guide plate may further include third protrusion patterns formed on a lower surface of the base plate opposite to the upper surface. The third protrusion patterns may have a cross-section of a triangular shape. The third protrusion patterns may be extended in a direction substantially perpendicular to an extension direction of the first and second protrusion patterns.

A light-guide plate according to an exemplary embodiment of the present invention includes first protrusion patterns and second protrusion patterns. The first protrusion patterns are formed on a left portion with respect to a central line. Each of the first protrusion patterns includes a first inclined surface inclined toward the central line. The first protrusion patterns may have a cross-section of a trapezoidal shape which has a top and a bottom substantially parallel with each other and first and second inclined sides inclined by the different angles with respect to the bottom side. The second protrusion patterns are formed on a right portion with respect to the central line. Each of the second protrusion patterns includes a third inclined side inclined toward the central line.

A light-guide plate according to an exemplary embodiment of the present invention includes a base plate, first protrusion patterns and second protrusion patterns. The first protrusion patterns are formed on an upper surface of the base plate. The first protrusion patterns have a variable density according to a position on the upper surface of the base plate. The first protrusion patterns have a cross-section of a trapezoidal shape which has a top and a bottom substantially parallel with each other and first and second inclined sides inclined by the different angles with respect to the bottom. The second protrusion patterns are formed on the upper surface. The second protrusion patterns have a variable density according to a position on the upper surface. The second protrusion patterns have a cross-section of the trapezoidal shape and are disposed substantially symmetrical to the first protrusion patterns.

A density of the first protrusion patterns may be substantially the same as a density of the second protrusion patterns in a central portion of the upper surface of the base plate. The density of the first protrusion patterns disposed on a left portion of the upper surface of the base plate with respect to a central line and the density of the second protrusion patterns disposed on a right portion of the upper surface of the base plate opposite the left portion with respect to the central line of the upper surface increase as a distance from the central portion increases.

The density of the first protrusion patterns may linearly decrease as a distance from a left side of the base plate increases and the density of the second protrusion patterns may linearly increase as the distance from the left side increases. The density of the first protrusion patterns may decrease along an exponential function curve as a distance from a left side of the base plate increases and the density of the second protrusion patterns may increases along an exponential function curve as the distance from the left side increases. The density of the first protrusion patterns may decrease along a trigonometric function curve as a distance from a left side of the base plate increases and the density of the second protrusion patterns may increases along the trigonometric function curve as the distance from the left side increases.

Each of the first protrusion patterns may include the first inclined side, the top and the second inclined side. The first inclined side is extended from the upper surface of the base plate and inclined toward a right direction. The top is extended from the first inclined side toward the right direction. The top is substantially parallel with the upper surface of the base plate. The second inclined side is extended from the top to the upper surface of the base plate. Each of the second protrusion patterns may include a third inclined side, a second top and a fourth inclined side. The third inclined side is extended from the upper surface of the base plate and inclined toward a left direction opposite to the right direction. The second top is extended from the third inclined side toward the left direction. The second top is substantially parallel with the upper surface of the base plate. The fourth inclined side is extended from the second top to the upper surface of the base plate.

The light-guide plate may further include third protrusion patterns formed on a lower surface of the base plate opposite the upper surface. The third protrusion patterns may have a cross-section of a triangular shape when viewed in a longitudinal direction. The third protrusion patterns may be extended in a direction substantially perpendicular to an extension direction of the first and second protrusion patterns.

A light-guide plate according to an exemplary embodiment of the present invention includes a first protrusion pattern and a second protrusion pattern. The first protrusion pattern has a cross-section of a trapezoidal shape which has a top and a bottom substantially parallel with each other and first and second inclined sides inclined by different angles with respect to the bottom. The second protrusion pattern has a cross-section of an isosceles triangle shape.

A light-guide plate according to an exemplary embodiment of the present invention includes a base plate and first protrusion patterns. The first protrusion patterns are disposed on a lower surface of the base plate. The first protrusion patterns have a variable density according to a distance from a lamp disposed adjacent to a side of the base plate and a cross-section of an isosceles triangle shape. A spacing distance of adjacent first protrusion patterns may decrease as a distance from a central line of the lower surface increases. Lengths of the first protrusion patterns may decrease as a distance from a central line of the lower surface increases.

A display apparatus according to an exemplary embodiment of the present invention includes a light-guide plate, a lamp disposed adjacent to a side of the light-guide plate and a display panel disposed on the light-guide plate. The display panel displays an image using light passing through the light-guide plate. The light-guide plate includes a base plate, first protrusion patterns and second protrusion patterns. The first protrusion patterns are formed on a left portion of an upper surface of the base plate with respect to a central line of the upper surface. The first protrusion patterns have a cross-section of a trapezoidal shape which has a top and a bottom substantially parallel with each other and first and second inclined sides inclined by different angles with respect to the bottom. The second protrusion patterns are formed on a right portion of the upper surface with respect to the central line. The second protrusion patterns have a symmetrical shape to the first protrusion patterns.

A display apparatus according to an exemplary embodiment of the present invention includes a light-guide plate, a lamp disposed adjacent to a side of the light-guide plate and display panel disposed on the light-guide plate. The display panel displays an image using light passing through the light-guide plate. The light-guide plate includes a base plate, first protrusion patterns and second protrusion patterns. The first protrusion patterns are formed on an upper surface of the base plate. The first protrusion patterns have a variable density according to a position on the upper surface. The first protrusion patterns have a cross-section of a trapezoidal shape which has a top and a bottom substantially parallel with each other and first and second inclined sides inclined by different angles with respect to the bottom when viewed in a longitudinal direction of the first protrusion patterns. The second protrusion patterns are formed on the upper surface. The second protrusion patterns have a variable density according to a position on the upper surface. The second protrusion patterns have a cross-section of the trapezoidal shape and are disposed substantially symmetrical to the first protrusion patterns.

BRIEF DESCRIPTION OF THE DRAWINGS

The present invention will become more apparent by describing in detailed exemplary embodiments thereof with reference to the accompanying drawings, in which.

DESCRIPTION OF EXEMPLARY EMBODIMENTS

Figure 1:
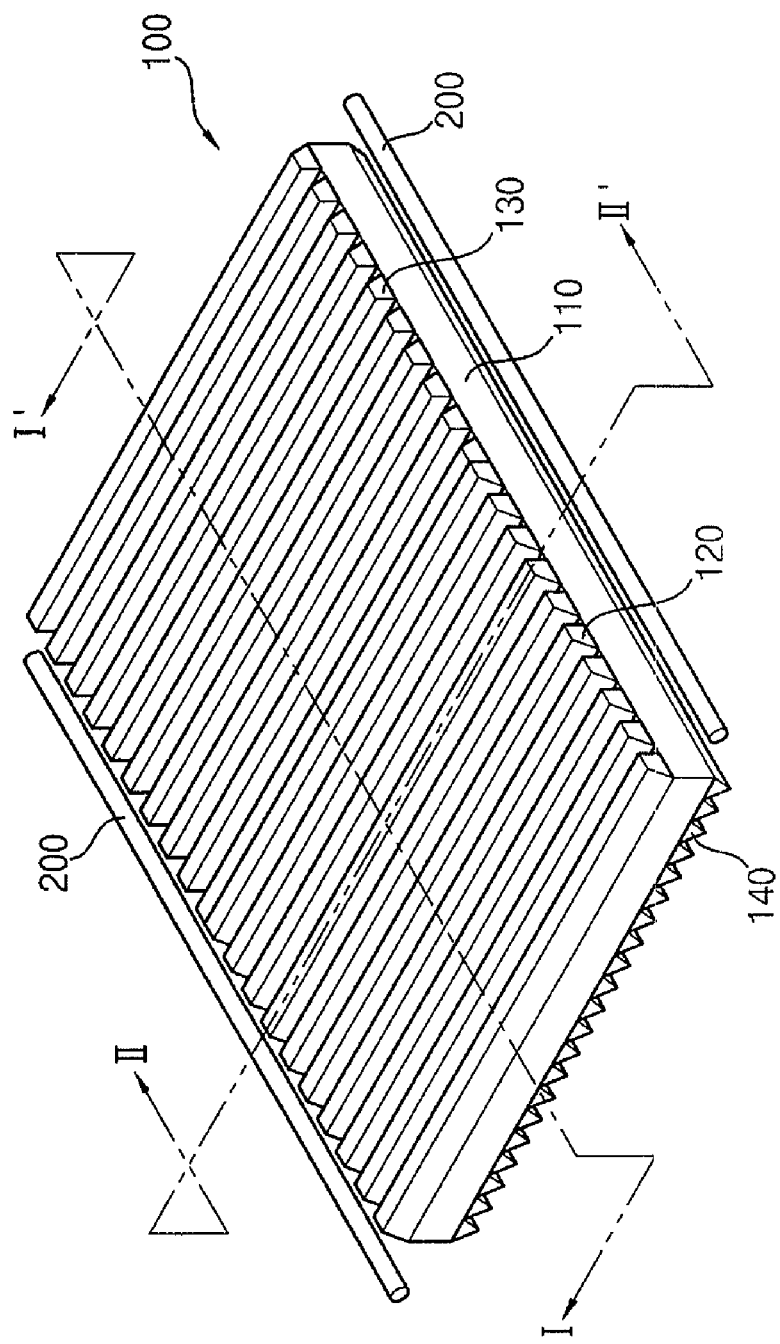
FIG. 1 is a perspective view illustrating a light-guide plate according to an exemplary embodiment of the present invention.

The invention is described more fully hereinafter with reference to the accompanying drawings, in which embodiments of the invention are shown. This invention may, however, be embodied in many different forms and should not be construed as limited to embodiments set forth herein. Rather, embodiments are provided so that this disclosure will be thorough and complete, and will fully convey the scope of the invention to those skilled in the art. In the drawings, the size and relative sizes of layers and regions may be exaggerated for clarity.

Hereinafter, the present invention will be explained in detail with reference to the accompanying drawings.

Figure 2:
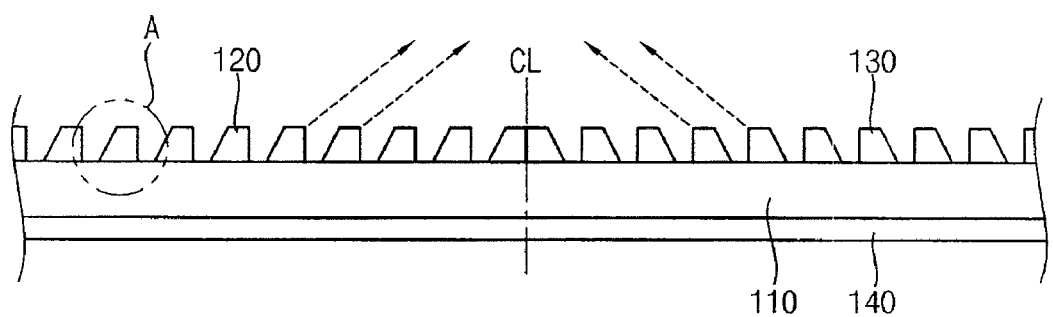
FIG. 2 is a cross-sectional view taken along a line I-I' shown in FIG. 1.
Figure 3:
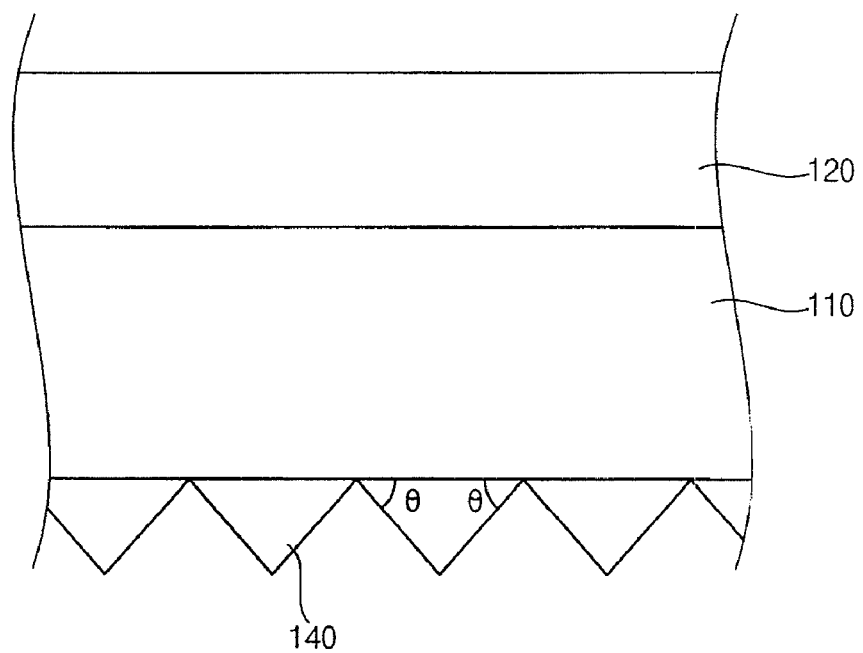
FIG. 3 is a cross-sectional view taken along a line II-II' shown in FIG. 1.

FIG. 1 is a perspective view illustrating a light-guide plate according to an exemplary embodiment of the present invention. FIG. 2 is a cross-sectional view taken along a line I-I' shown in FIG. 1. FIG. 3 is a cross-sectional view taken along a line II-II' shown in FIG. 1.

Referring to FIGS. 1 to 3, a light-guide plate 100 according to an exemplary embodiment of the present invention includes a base plate 110, first protrusion patterns 120 and second protrusion patterns 130. The first protrusion patterns 120 and the second protrusion patterns 130 are formed on an upper surface of the base plate 110.

The base plate 110 has a predetermined thickness. The base plate 110 includes a transparent material through which light generated by lamps 200 progresses. The lamps 200 are disposed adjacent to a first side of the base plate 110 and a second side of the base plate 110 opposite the first side. Examples of the transparent material include polymethyl methacrylate (PMMA), polyethylene terephthalate (PET), polycarbonate (PC), etc. The base plate 110 may include a light diffuser diffusing the light progressing through the base plate 110.

The first protrusion patterns 120 are formed on a left portion of the base plate 110 with respect to a central line CL of the base plate 110. The first protrusion patterns 120 extend substantially parallel to one another in a first direction. The first direction may be, for example, a direction different from a longitudinal direction of the lamps 200, a direction substantially perpendicular to the longitudinal direction of the lamps 200, a direction substantially parallel with the longitudinal direction of the lamps 200, etc.

The first protrusion patterns 120 each have a cross-section of a trapezoidal shape as viewed in an extending direction. For example, as a distance from the upper surface of the base plate 110 increases, a width of the cross-section of each first protrusion pattern 120 decreases. Each of the first protrusion patterns 120 includes an inclined surface which is inclined toward the central line CL in order to perpendicularly emit the light to the upper surface of the base plate 110. In the trapezoid shaped cross-section of each of the first protrusion patterns 120, a first side corresponding to the inclined surface has a different length from a second side opposite the first side.

The first protrusion patterns 120 have substantially the same size. The first protrusion patterns 120 are spaced apart from one another. Alternatively, the first protrusion patterns 120 may abut one another.

The second protrusion patterns 130 are formed on a right portion of the base plate 110 with respect to the central line CL. Each of the second protrusion patterns 130 includes an inclined surface which is inclined toward the central line CL in order to perpendicularly emit the light to the upper surface of the base plate 110. The second protrusion patterns 130 each have a cross-section of a trapezoidal shape when viewed in an extending direction. For example, the shape of the second protrusion patterns 130 may be substantially symmetrical to the shape of the first protrusion patterns 120.

The light-guide plate 100 may further include third protrusion patterns 140 formed on a lower surface of the base plate 110 opposite the upper surface of the base plate 110.

The third protrusion patters 140 are extended in a second direction. When each of the third protrusion patterns 140 is viewed in the second direction, each of the third protrusion patterns 140 may have a cross-section of a substantially equilateral triangle shape. For example, the third protrusion patterns 140 may be extended in a direction substantially perpendicular to a direction in which the first and second protrusion patterns 120 and 130 are extended and substantially parallel with the longitudinal direction of the lamps 200.

The first, second and third protrusion patterns 120, 130 and 140, and the base plate 110 may be formed using the same material. Alternatively, the first, second and third protrusion patterns 120, 130 and 140, and the base plate 110 may be formed using different materials from each other. When the first, second and third protrusion patterns 120, 130 and 140 and the base plate 110 are formed using different materials from each other, refractive indexes of the first, second and third protrusion patterns 120, 130 and 140 may be similar to a refractive index of the base plate 110.

The light-guide plate 100 including the first protrusion patterns 120, the second protrusion patterns 130 and the third protrusion patterns 140 may be formed through an injection molding method or a stepping method.

The light-guide plate 100 having the first and second protrusion patterns 120 and 130 formed on the upper surface of the base plate 110 and the third protrusion patterns 140 formed on the lower surface of the base plate 110 refracts and reflects light. Since the first and second protrusion patterns 120 and 130 formed on the upper surface of the base plate 110 have a trapezoidal shape and are substantially symmetrical to each other with respect to the central line CL, light upwardly emitted from the light-guide plate 100 is inclined into a central portion of the light-guide plate 100.

Table 1 illustrates brightness levels and viewing angles according to a structure of the light-guide plate. In Table 1, the viewing angle properties are deduced from viewing angle indexes according to TCO standards related to viewing angles.

TABLE 1

|  | Comparative Example 1 | Comparative Example 2 | Example 1 |
|---|---|---|---|
| Brightness level | 100% | 105% | 95% |
| Viewing angle index | 1.49 | 1.95 | 1.56 |

Referring to Table 1, according to comparative example 1, in which a diffusion sheet, a prism sheet and a protection sheet are sequentially disposed on a printed light-guide plate having no protrusion patterns, the viewing angle index was measured to be about 1.49.

According to comparative example 2, in which only a diffusion sheet is disposed on the prism light-guide plate, the brightness was measured to be 105% with reference to comparative example 1. The viewing angle index was measured to be 1.95. Therefore, comparative example 2 had a similar brightness level to comparative example 1, but the viewing angle is deteriorated in comparison with comparative example 1.

According to example 1, in which a diffusion sheet is disposed on the light-guide plate in FIG. 1, the brightness was measured to be 95% with reference to comparative example 1. The viewing angle index was 1.56. Therefore, the light-guide plate of example 1 had a similar brightness level and a viewing angle index to comparative example 1.

Accordingly, although the light-guide plate of example 1 did not have the prism sheet and the protection sheet, the light-guide plate of example 1 had a similar brightness level and a viewing angle index to comparative example 1. Thus, manufacturing costs may be reduced, compared with comparative example 1. In addition, the light-guide plate of example 1 may improve the viewing angle, compared with comparative example 2.

Figure 4:
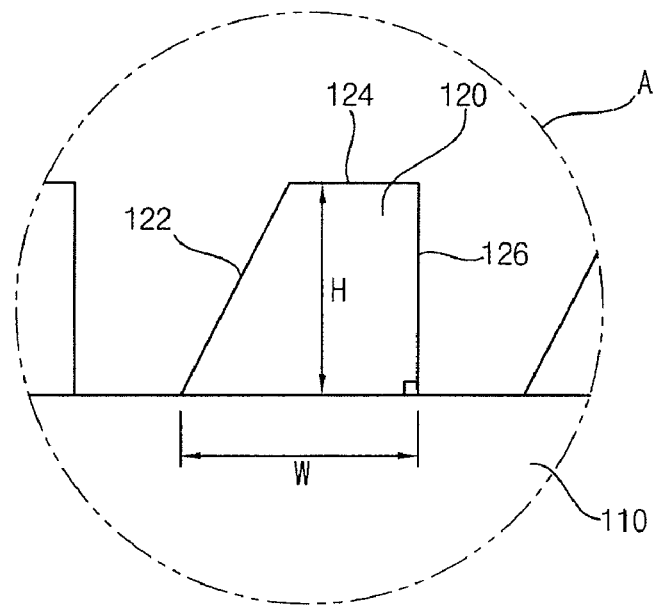
FIG. 4 is an enlarged cross-sectional view illustrating a region 'A' shown in FIG. 2.

FIG. 4 is an enlarged cross-sectional view illustrating region 'A' shown in FIG. 2.

Referring to FIGS. 2 and 4, each of the first protrusion patterns 120 includes a first surface 122, a second surface 124 and a third surface 126. The first surface 122 is extended from the upper surface of the base plate 110 toward the central line CL. The second surface 124 is extended from the first surface toward the central line CL, and is substantially parallel with the upper surface of the base plate 110. The third surface 126 is extended from the second surface 124 to the upper surface of the base plate 110.

The first surface 122 is inclined toward the central line CL. The first surface 122 changes a direction of the light from a left direction of the light-guide plate 100 into an upper direction of the light-guide plate 100. For example, the first surface 122 is inclined by about 30° to about 60° toward the central line CL with respect to the upper surface of the base plate 110. In FIG. 4, the first surface 122 is inclined by about 50° toward the central line CL with respect to the upper surface of the base plate 110.

The second surface 124 is a substantially flat surface. When the second surface 124 is disposed as a flat surface, a range of an angle of the light emitted from the light-guide plate 100 may be increased.

The third surface 126 has a shorter length than the first surface 122. Therefore, each of the first protrusion patterns 120 has a trapezoidal cross-section, and a second side corresponding to the third surface 126 is shorter than a first side corresponding to the first surface 122. The third surface 126 reflects light passing through the first protrusion patterns 120 toward a left direction with respect to the central line CL so that the light reflected from the third surface 126 passes through adjacent ones of the first protrusion patterns 120 disposed toward the central line CL. For example, the third surface 126 may be extended in a substantially perpendicular direction to the upper surface of the base plate 110.

A distance between central portions of adjacent first protrusion patterns 120 may be variable according to products or shapes of the third protrusion patterns 140. For example, the distance between the central portions of adjacent first protrusion patterns 120 may be in a range of about 50 μm to about 200 μm. A width 'W' of each first protrusion pattern 120 may be half of the distance between the central portions of adjacent first protrusion patterns 120 in consideration of brightness, viewing angle, etc. For example, the width W of each first protrusion pattern 120 is in a range of about 30 μm to about 100 μm and a height H of each first protrusion pattern 120 is in a range of about 30 μm to about 100 μm.

The second protrusion patterns 130 have a substantially symmetrical shape to the first protrusion patterns 120. Thus, any explanation concerning the second protrusion patterns 130 will be omitted.

Figure 5:
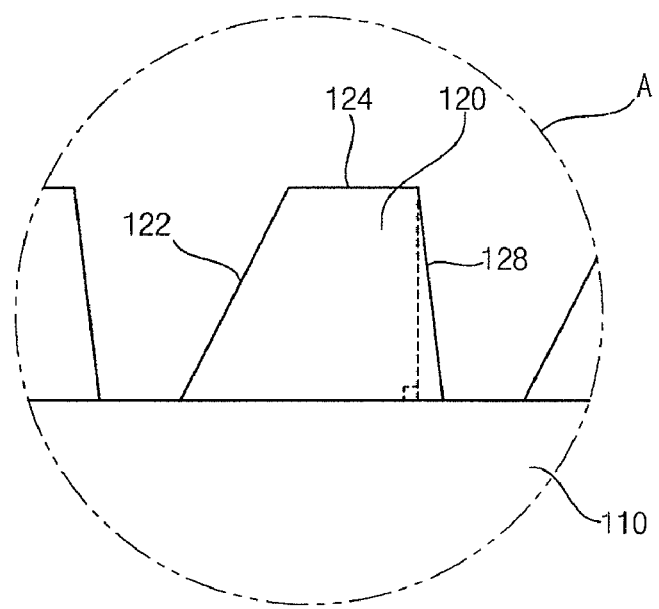
FIG. 5 is an enlarged cross-sectional view illustrating a region 'A' shown in FIG. 2 of a light-guide plate according to an exemplary embodiment of the present invention.

FIG. 5 is an enlarged cross-sectional view illustrating the region 'A' shown in FIG. 2 of a light-guide plate according to an exemplary embodiment of the present invention.

Referring to FIGS. 2 and 5, the third surface 128 may be inclined in a direction opposite that of the first surface 122. When the third surface 128 is inclined in the direction opposite that of the first surface 122, an angle between the third surface 128 and the upper surface of the base plate 110 may be larger than an angle between the first surface 122 and the upper surface of the base plate 110 so that an amount of light emitted toward a central portion of the light-guide plate 100 may be increased.

Figure 6:
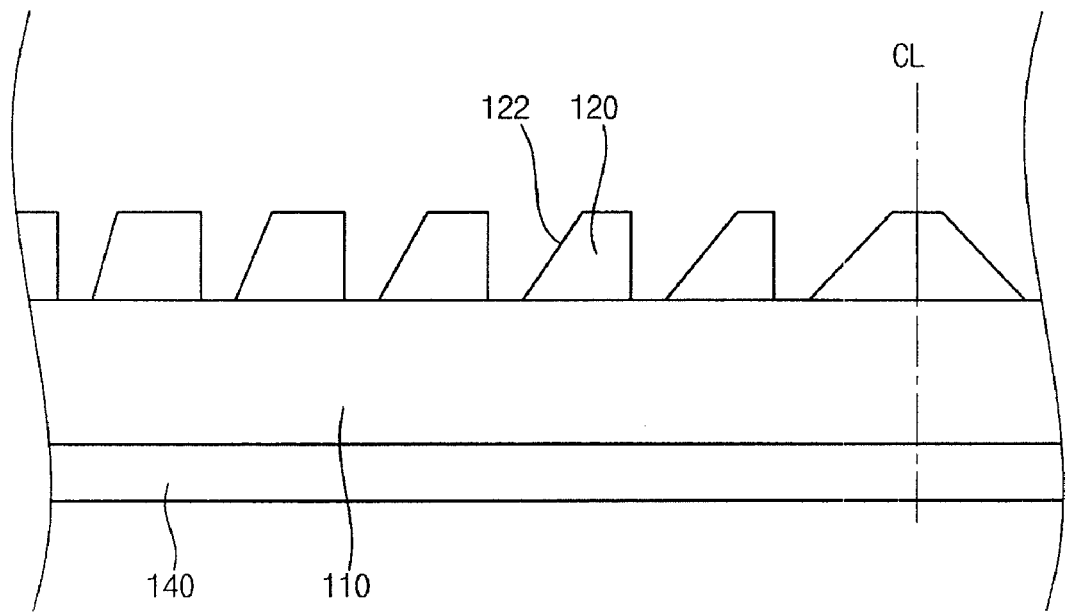
FIG. 6 is a cross-sectional view illustrating a light-guide plate according to an exemplary embodiment of the present invention.

FIG. 6 is a cross-sectional view illustrating a light-guide plate according to an exemplary embodiment of the present invention.

Referring to FIG. 6, angles between the first surfaces 122 of the first protrusion patterns 120 and the upper surface of the base plate 100 may be different from one another. When the angles between the first surfaces 122 and the upper surface of the base plate 110 are different from one another, angles of the light emitted from the first protrusion patterns 120 may be controlled so that viewing angle properties and the viewing angle may be improved. For example, the angles between the first surfaces 122 and the upper surface of the base plate 110 may increase as a distance from the central line CL increases. Alternatively, the angles between the first surfaces 122 and the upper surface of the base plate 110 may be decreased as the distance from the central line CL increases.

Figure 7:
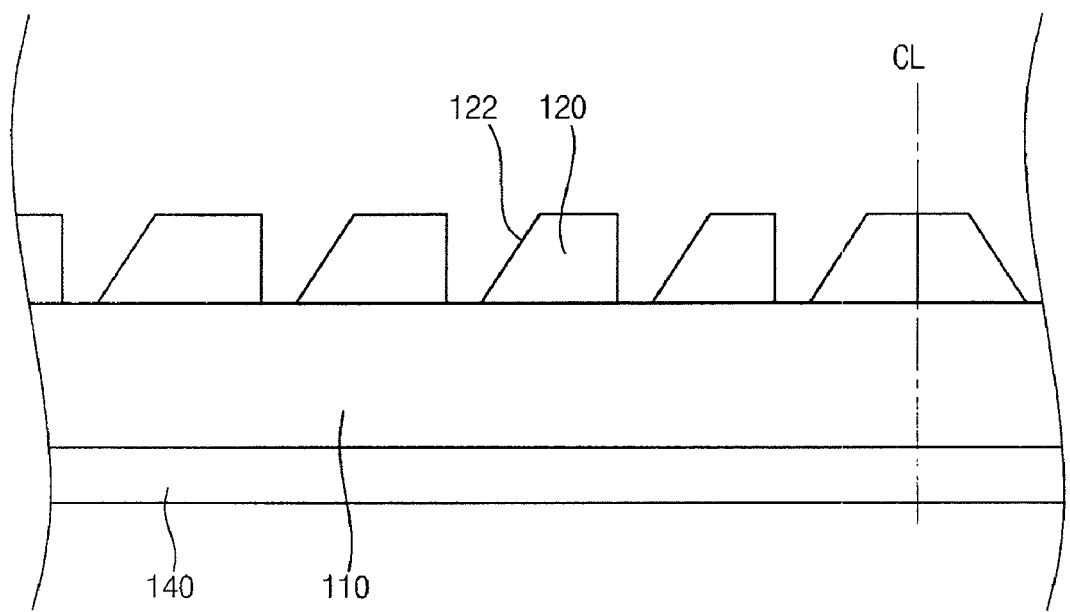
FIG. 7 is a cross-sectional view illustrating a light-guide plate according to an exemplary embodiment of the present invention.

FIG. 7 is a cross-sectional view illustrating a light-guide plate according to an exemplary embodiment of the present invention.

Referring to FIG. 7, the first protrusion patterns 120 may have different widths from one another. When the first protrusion patterns 120 have different widths from one another, brightness uniformity of the light emitted from the first protrusion patterns 120 may be improved. For example, the widths of the first protrusion patterns 120 may increase as the distance from the central line CL increases. Alternatively, the widths of the first protrusion patterns 120 may decrease as the distance from the central line CL increases.

Figure 8:
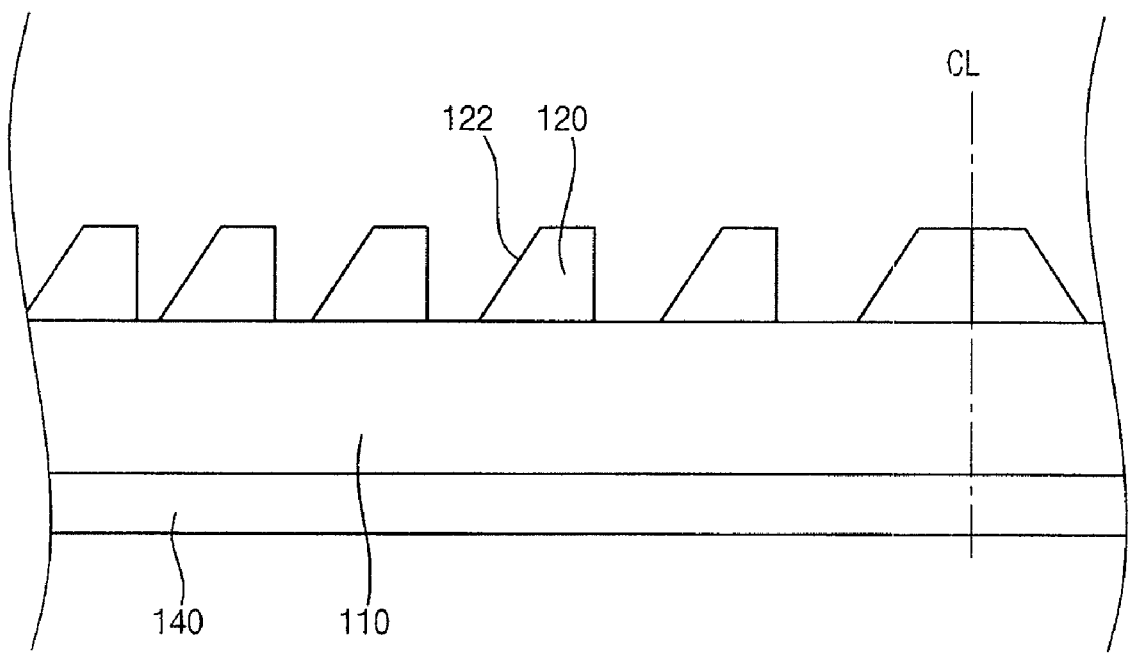
FIG. 8 is a cross-sectional view illustrating a light-guide plate according to an exemplary embodiment of the present invention.

FIG. 8 is a cross-sectional view illustrating a light-guide plate according to an exemplary embodiment of the present invention.

Referring to FIG. 8, distances between central portions of adjacent first protrusion patterns 120 may be different from one another. When the distances between the central portions of adjacent first protrusion patterns 120 are different from one another, the brightness uniformity of light emitted from the first protrusion patterns 120 may be improved. For example, the distances between the central portions of adjacent first protrusion patterns 120 may increase as the distance from the central line CL increases. Alternatively, the distances between the central portions of the adjacent first protrusion patterns 120 may decrease as the distance from the central line CL increases.

Since the light-guide plates according to exemplary embodiments include the first protrusion patterns formed on the left portion of the base plate with respect to the central line and the second protrusion patterns formed on the right portion of the base plate with respect to the central line, light emitted from the left portion of the light-guide plate with respect to the central line is inclined toward a right direction and light emitted from the right portion of the light-guide plate with respect to the central line is inclined toward a left direction. Therefore, brightness of the left portion of the light-guide plate may be different from brightness of the right portion of the light-guide plate. Arrangement of the first and second protrusion patterns may be changed to reduce the difference of brightness between the left portion and the right portion.

Figure 9:
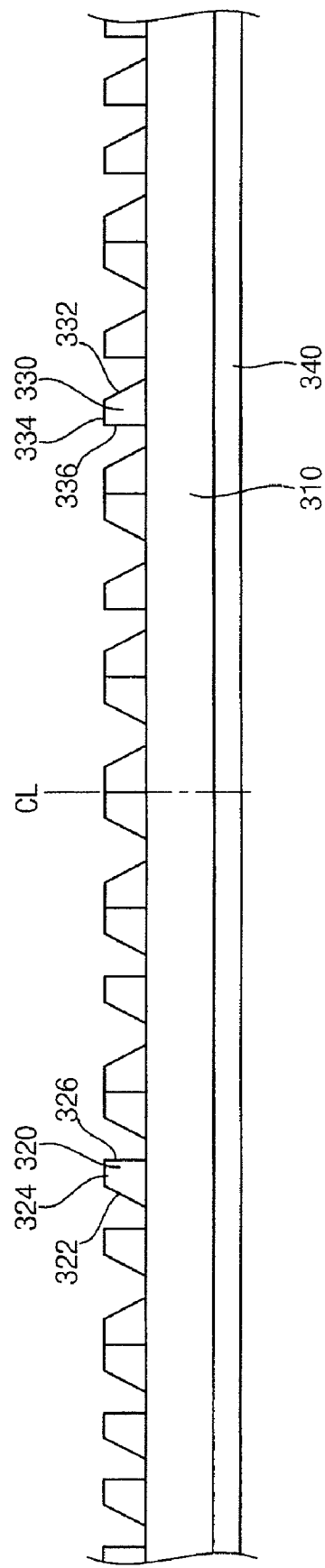
FIG. 9 is a cross-sectional view illustrating a light-guide plate according to an exemplary embodiment of the present invention.

FIG. 9 is a cross-sectional view illustrating a light-guide plate according to an exemplary embodiment of the present invention.

Referring to FIG. 9, a light-guide plate 300 includes first and second protrusion patterns 320 and 330 formed on an upper surface of a base plate 310 and third protrusion patterns 340 formed on a lower surface of the base plate 310 opposite the upper surface. The first and second protrusion patterns 310 and 320 may have a variable density, which is the number of protrusion patterns per unit area, according to positions of the upper surface of the base plate 310. In an exemplary embodiment of the present invention shown in FIG. 9, the base plate 310 and the third protrusion patterns 340 are substantially the same as the base substrate 110 and the third protrusion patterns 140 shown in FIGS. 2 and 3. Thus, any repetitive explanation concerning the base plate 310 and the third protrusion patterns 340 will be omitted.

Each of the first protrusion patterns 320 and second protrusion patterns 330 have trapezoidal cross-sections. The first protrusion patterns 320 may have a substantially symmetrical shape to the second protrusion patterns 330. Each of the first protrusion patterns 320 includes a left inclined surface. The first protrusion patterns 320 emit light toward a right direction of the base plate 310. Each of the second protrusion patterns 330 includes a right inclined surface. The second protrusion patterns 330 emit light toward a left direction of the base plate 310.

For example, each of the first protrusion patterns 320 may include a first surface 322, a second surface 324 and a third surface 326, and each of the second protrusion patterns 330 may include a fourth surface 332, a fifth surface 334 and a sixth surface 336. The first surface 322 extends from the upper surface of the base plate 310 and is inclined toward a right direction of the base plate 310. The second surface 324 extends from the first surface 322 and is substantially parallel with the upper surface of the base plate 310. The third surface 326 extends from the second surface to the upper surface of the base plate 310. The fourth surface 332 extends from the upper surface of the base plate 310 and is inclined toward a left direction of the base plate 310. The fifth surface 334 extends from the fourth surface 332 and is substantially parallel with the upper surface of the base plate 310. The sixth surface 336 extends from the fifth surface 334 to the upper surface of the base plate 310. An angle between the first surface 322 and the upper surface of the base plate 310 may be in a range of about 30° to about 60°. An angle between the fourth surface 332 and the upper surface of the base plate 310 may be in a range of about 30° to about 60°. For example, the angle between the first surface 322 and the upper surface of the base plate 310 and the angle between the fourth surface 332 and the upper surface of the base plate 310 may be about 50°. The third surface 326 may have a length shorter than the first surface 322 and the sixth surface 336 may have a length shorter than the fourth surface 332. For example, an angle between the third surface 326 and the upper surface of the base plate 310 and an angle between the sixth surface 336 and the upper surface of the base plate 310 may be about 90°. A width and a height of the first and second protrusion patterns 320 and 330 may each be about 100 μm or less. For example, each of the first and second protrusion patterns 320 and 330 may have a width of about 30 μm to about 100 μm and a height of about 30 μm to about 100 μm.

In order to improve the viewing angle, the first and second protrusion patterns 320 and 330 may have a variable density according to positions of the upper surface of the base plate 310. For example, the density of the first protrusion patterns 320 may decrease as a distance from a left side of the light-guide plate 300 increases and the density of the second protrusion patterns 330 may increase as the distance from the left side of the light-guide plate 300 increases.

When the density of each of the first and second protrusion patterns 320 and 330 varies according to a position on the upper surface of the base plate 310 as mentioned above, the density of the first protrusion patterns 320 and the density of the second protrusion patterns 330 are substantially the same as each other relative to a central portion of the light-guide plate 300, the density of the first protrusion patterns 320 is greater than the density of the second protrusion patterns 330 in a left portion of the light-guide plate 300, and the density of the first protrusion patterns 320 is less than the density of the second protrusion patterns 330 in a right portion of the light-guide plate 300.

When the density of each of the first and second protrusion patterns 320 and 330 varies according to the position on the upper surface of the base plate 310 as mentioned above, the first protrusion patterns 320 may abut the second protrusion patterns 330 in a first region of the light-guide plate 300 and the first protrusion patterns 320 may be spaced apart from the second protrusion patterns 330 in a second region of the light-guide plate 300. In the second region in which the first protrusion patterns 320 abut the second protrusion patterns 330, the first and second protrusion patterns 320 and 330 abutting each other may form a protrusion pattern having a cross-section of trapezoidal shape of which a first side has the same length as a second side opposite to the first side.

FIGS. 10 to 13 are graphs illustrating a density of each of first and second protrusion patterns relative to a position on the light-guide plate.

Figure 10:
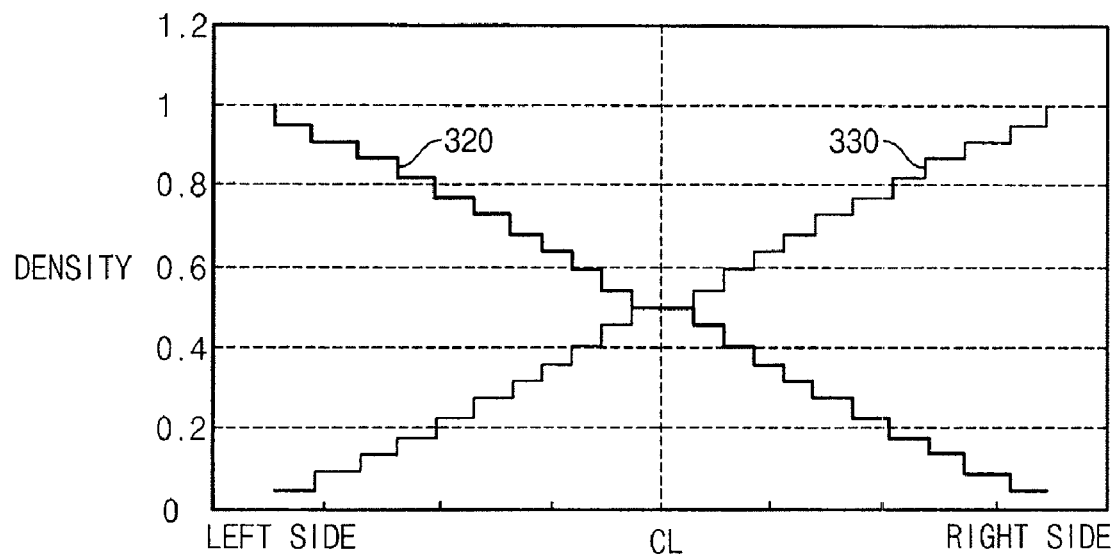
FIGS. 10 to 13 are graphs illustrating densities of first and second protrusion patterns to a position of the light-guide plate.

Referring to FIG. 10, the density of the first protrusion patterns 320 linearly decreases as the distance from the left side of the base plate 310 increases, and the density of the second protrusion patterns 330 linearly increases as the distance from the left side of the base plate 310 increases.

Figure 11:
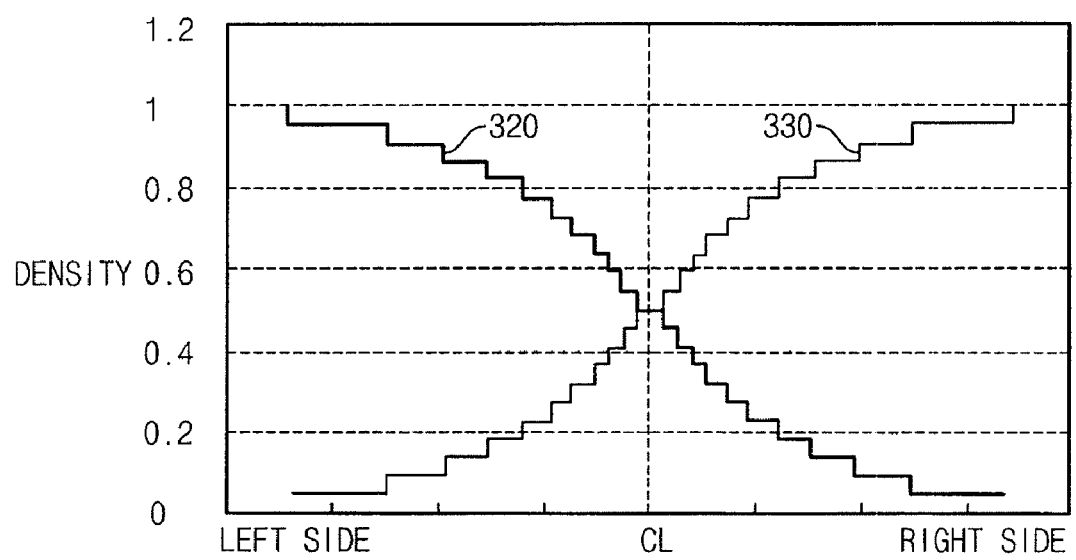

Referring to FIG. 11, the density of the first protrusion patterns 320 decreases in a form of an exponential function with increasing distance from the left side of the base plate 310, and the density of the second protrusion patterns 330 increases in the form of the exponential function with increasing distance from the left side of the base plate 310.

Figure 12:
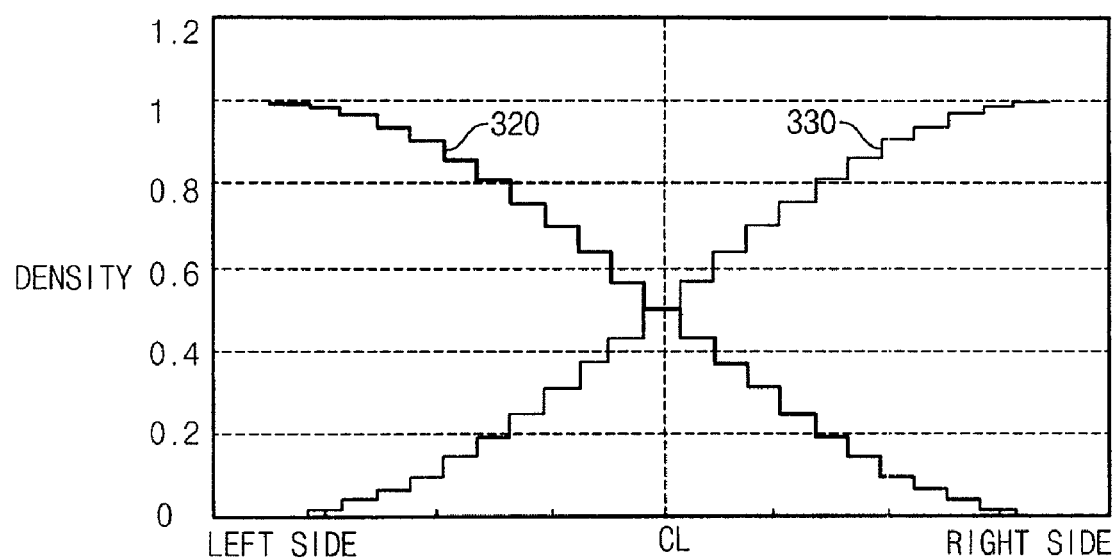

Referring to FIG. 12, the density of the first protrusion patterns 320 decreases in a form of a first trigonometric function with increasing distance from the left side of the base plate 310, and the density of the second protrusion patterns 330 increases in the form of the first trigonometric function with increasing distance from the left side of the base plate 310.

Figure 13:
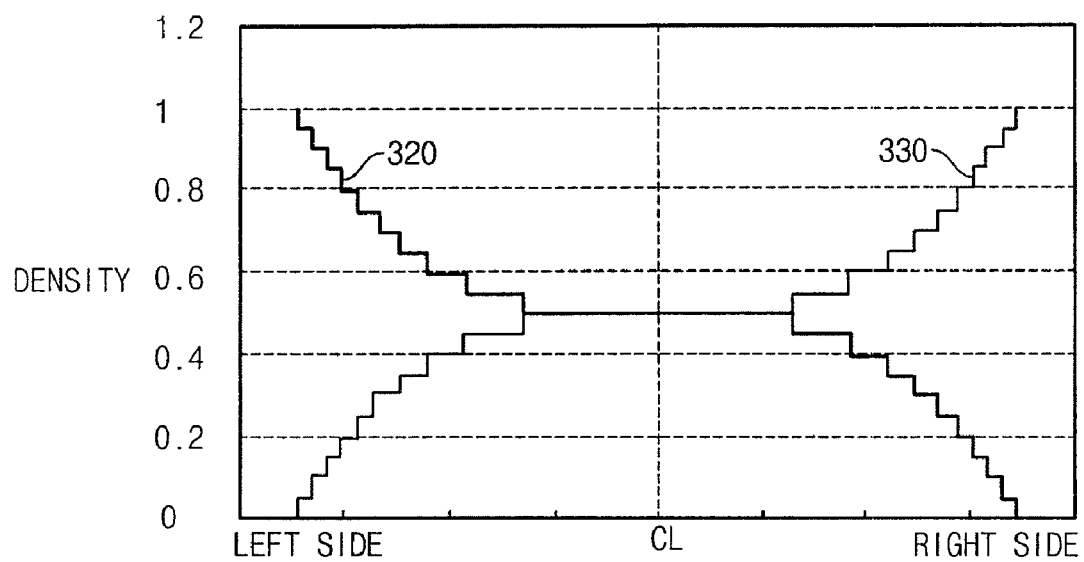

Referring to FIG. 13, the density of the first protrusion patterns 320 decreases in a form of a second trigonometric function with increasing distance from the left side of the base plate 310, and the density of the second protrusion patterns 330 increases in the form of the second trigonometric function with increasing distance from the left side of the base plate 310.

When the density of each of the first and second protrusion patterns 320 and 330 varies according to the position on the upper surface of the base plate 310, brightness of the left portion of the light-guide plate 300 and brightness of the right portion of the light-guide plate 300 may varied so that the brightness difference between the left portion and the right portion may decrease. Therefore, the viewing angle properties and the display quality may be improved when the density of each of the first and second protrusion patterns 320 and 330 is changed according to the position on the upper surface of the base plate 310.

Figure 14:
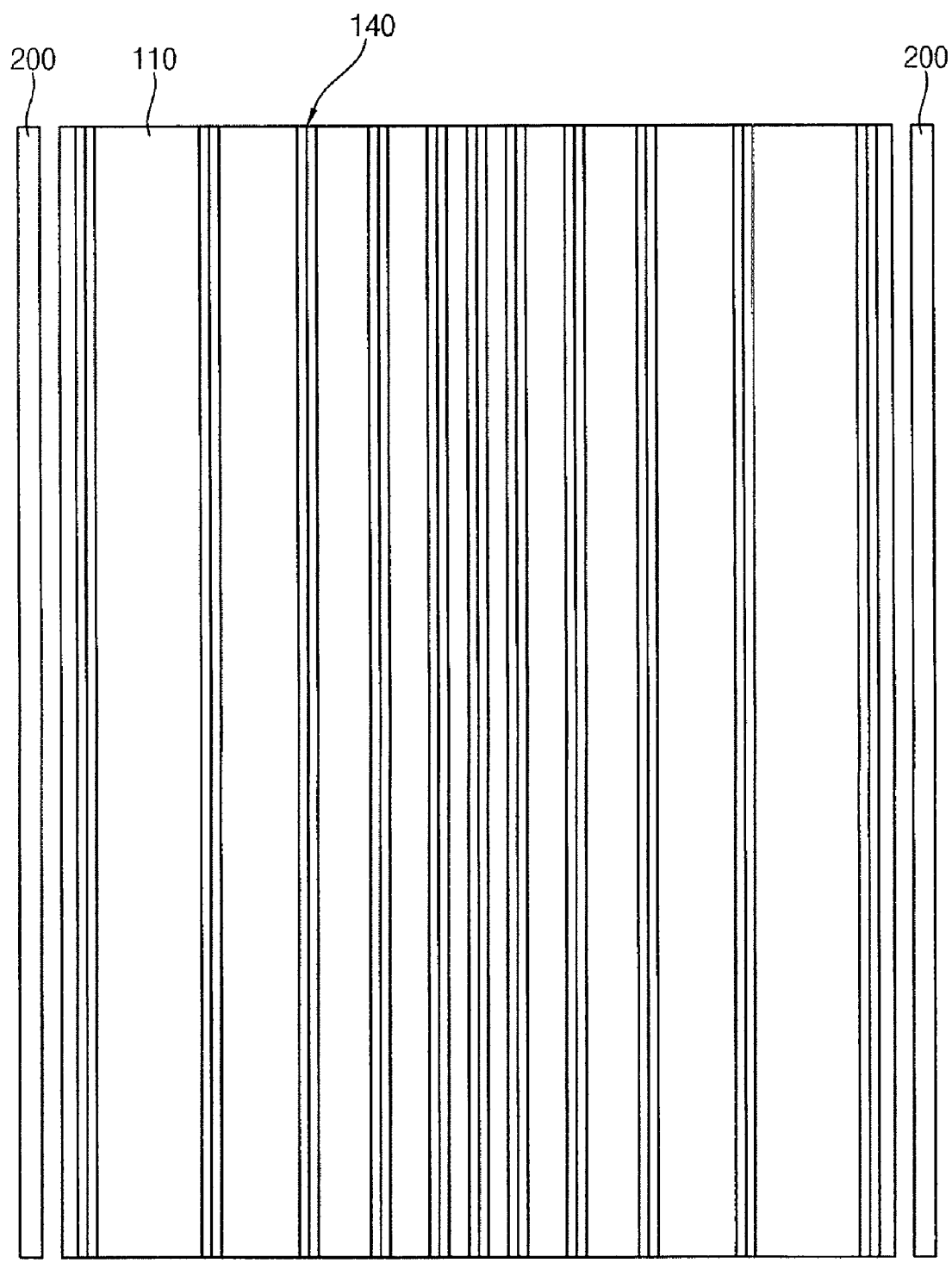
FIG. 14 is a plan view illustrating a light-guide plate according to an exemplary embodiment of the present invention.

FIG. 14 is a plan view illustrating a light-guide plate according to an exemplary embodiment of the present invention.

Referring to FIGS. 3 and 14, each of the third protrusion patterns 140 formed on the lower surface of the base plate 110 has a cross-section of, substantially, an isosceles triangle when each of the third protrusion patterns 140 is viewed in a longitudinal direction.

A density of the third protrusion patterns 140 varies according to a distance from the lamps 200. For example, the lamps 200 are respectively disposed adjacent to a first side and a second side of the base plate 110. A distance between adjacent third protrusion patterns 140 decreases with increasing distance from the first side of the base plate 110 in a left portion of the base plate 110 with respect to a center line of the base plate 110 between the first side and the second side. A distance between adjacent third protrusion patterns 140 decreases with increasing distance from the second side of the base plate 110 in a right portion of the base plate with respect to the center line. Therefore, a density of the third protrusion patterns 140 greater in a central portion of the base plate 110 adjacent to the center line. For example, a spacing distance between adjacent third protrusion patterns 140 may be in a range of about 50 µm to about 1000 µm.

When the density of the third protrusion patterns 140 is uniform, an amount of light emitted through portions of the light-guide plate 100 adjacent to the lamps 200 may increase. Therefore, the central portion of the light-guide plate 100 may be darker than the portions of the light-guide plate adjacent to the lamps 200. However, brightness uniformity may be improved when the density of the third protrusion patterns 140 increases with increasing distance from the first and second sides.

Figure 15:
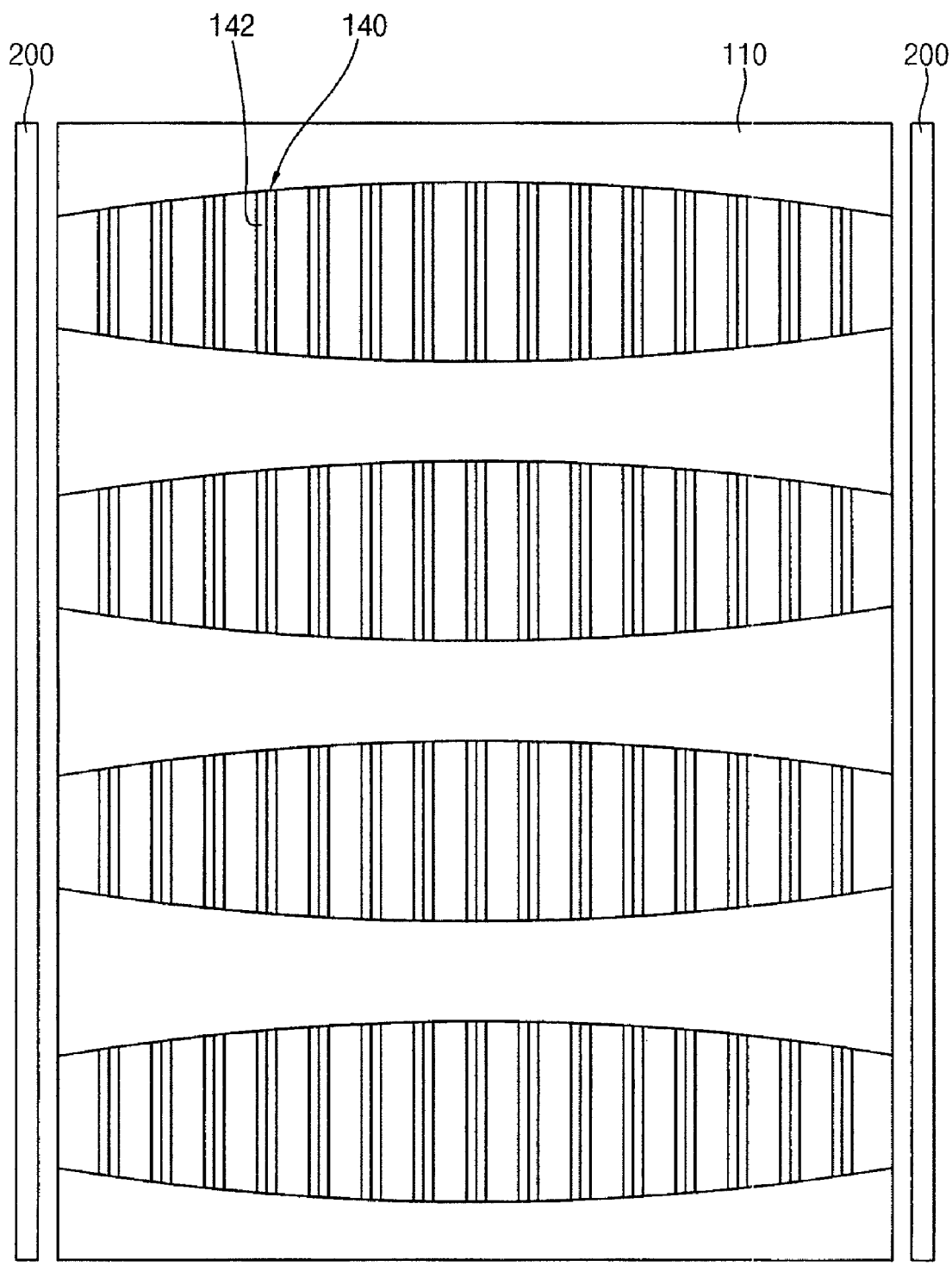
FIG. 15 is a plan view illustrating a light-guide plate according to an exemplary embodiment of the present invention.

FIG. 15 is a plan view illustrating a light-guide plate according to an exemplary embodiment of the present invention.

Referring to FIGS. 3 and 15, a length of each of the third protrusion patterns 140 formed on the lower surface of the base plate 110 may be larger in the left portion of the base plate 110 with increasing distance from the first side, and the length of each of the third protrusion patterns 140 may be larger in the right portion of the base plate 110 with increasing distance from the second side. Thus, the length of the third protrusion patterns 140 may be largest in the central portion of the base plate 110.

Each of the third protrusion patterns 140 may include a plurality of unit patterns 142 arranged in a line along a longitudinal direction of each third protrusion pattern 140. For example, when each of the third protrusion patterns 140 includes the same number of the unit patterns 142, a length of each of the unit patterns 142 may increase with increasing distance from the first side in the left portion of the base plate 110, and the length of each the unit patterns 142 may increase with increasing distance from the second side in the right portion of the base plate 110. The length of each of the unit patterns 142 may be in a range of about 10 µm to about 300 µm in consideration of the viewing properties. Alternatively, the unit patterns 142 may have the same length, and the number of unit patterns 142 may vary among the third protrusion patterns 140.

Therefore, the brightness uniformity may be improved when the lengths of the third protrusion patterns 140 increases towards the central portion of the base plate 110.

Figure 16:
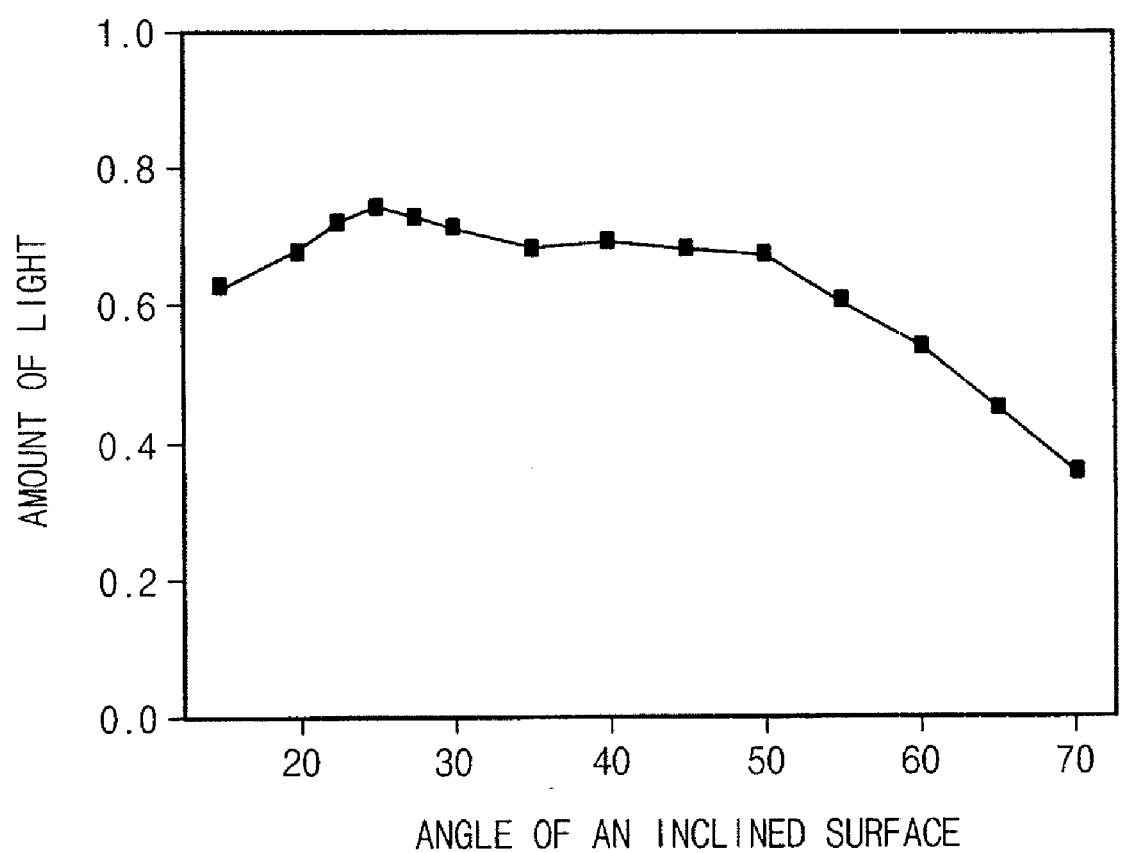
FIG. 16 is a graph illustrating an amount of light according to an angle of a hypotenuse of a third protrusion pattern.

FIG. 16 is a graph illustrating light transmittance according to an angle of a hypotenuse of a third protrusion pattern.

Referring to FIGS. 3 and 16, each of the third protrusion patterns 140 includes a first inclined surface which is inclined toward a first direction and a second inclined surface which is inclined toward a second direction opposite the first direction. An amount of light emitted from the light-guide plate 100 may be changed according to an angle between the first inclined surface and the lower surface of the base plate 110 and an angle between the second inclined surface and the lower surface of the base plate 110. According to the exemplary graph, when the angle between the first inclined surface and the lower surface of the base plate 110 and the angle between the second inclined surface and the lower surface of the base plate 110 are about 25°, an amount of the light emitted from the light-guide plate 100 may be maximized. When the angle between the first inclined surface and the lower surface of the base plate 110 and the angle between the second inclined surface and the lower surface of the base plate 110 are in a range of about 20° to about 50°, the light emitted from the light-guide plate 100 may be substantially uniform. When the angel between the first inclined surface and the lower surface of the base plate 110 and the second inclined surface and the lower surface of the base plate 110 are in a range of about 20° to about 60°, about 50% or more of the total light received by the light-guide plate 100 may be emitted from the light-guide plate 100. The angle between the first inclined surface and the lower surface of the base plate 110 and the angle between the second inclined surface and the lower surface of the base plate 110 may be changed according to a thickness of the light-guide plate and kinds of the lamps 200.

Each of the third protrusion patterns 140 may have a width of about 50 µm to about 200 µm in consideration of the viewing properties.

Figure 17:
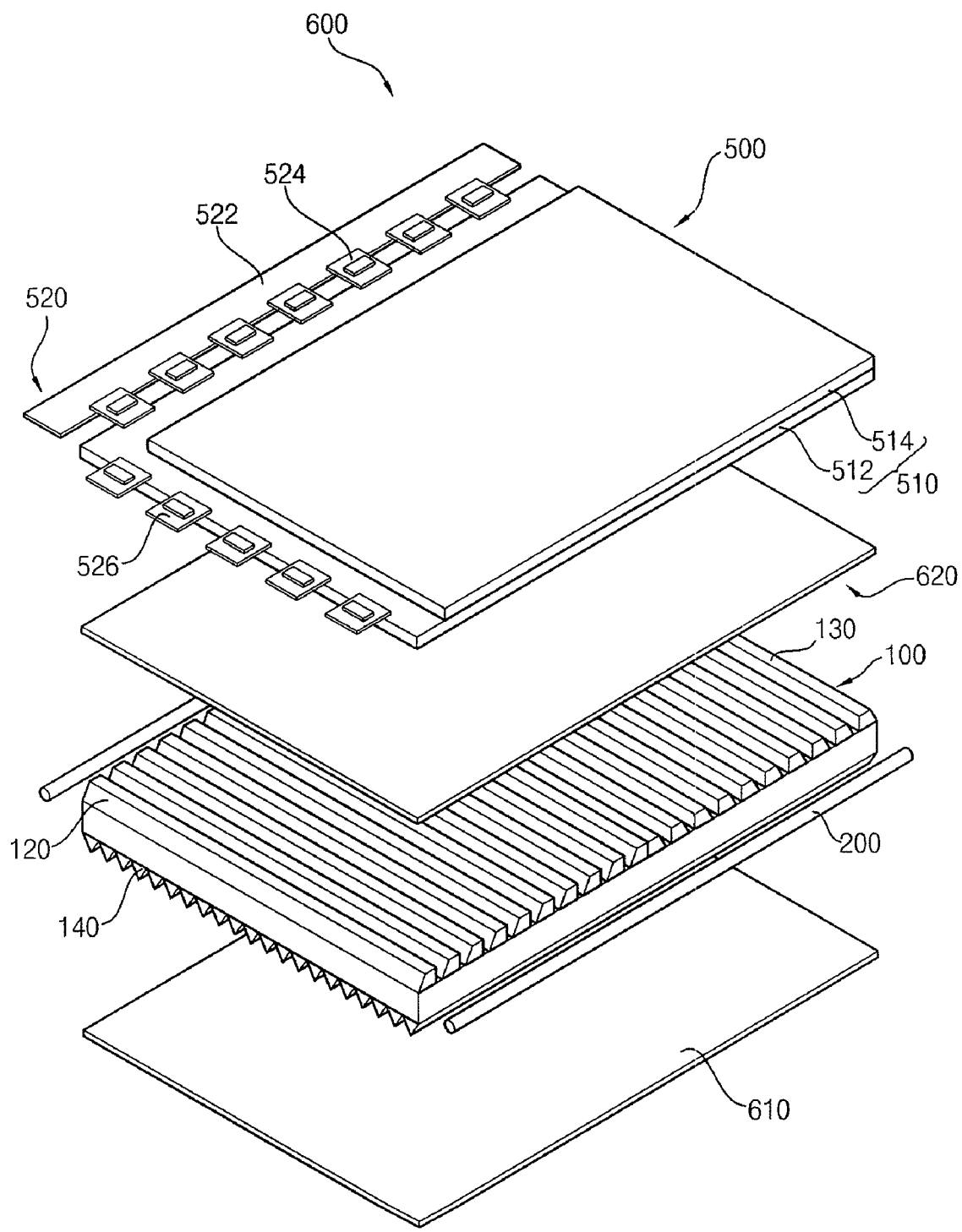
FIG. 17 is an exploded perspective view illustrating a display apparatus according to another exemplary embodiment of the present invention.

FIG. 17 is an exploded perspective view illustrating a display apparatus according to another exemplary embodiment of the present invention.

Referring to FIG. 17, a display apparatus 600 according to an exemplary embodiment of the present invention includes lamps 200 generating light, a light-guide plate 100 guiding the light generated by the lamps 200 and a display panel assembly 500 displaying an image.

The light-guide plate 100 is substantially the same as the light-guide plate shown in FIGS. 1 to 4. Thus, the same reference numerals refer to same or similar components, and any repetitive explanation concerning the light-guide plate 100 will be omitted. Alternatively, the light-guide plate 100 may be substantially the same as the light-guide plate shown in FIGS. 5 to 9, 14 and 15.

The lamps 200 are disposed adjacent to a first side of the light-guide plate 100 and a second side of the light-guide plate 100 opposite the first side, and generate light. For example, a longitudinal direction of the lamps 200 is substantially perpendicular to an extending direction of the first and second protrusion patterns 120 and 130 formed on the upper surface of the base plate and substantially parallel with an extending direction of the third protrusion patterns 140.

The lamps 200 may be implemented as a cold cathode fluorescent lamp (CCFL) having a shape of a narrow, long cylinder. Alternatively, the lamps 200 may be implemented as an external electrode fluorescent lamp (EEFL) having an external electrode formed on an outer surface thereof. Alternatively, a plurality of light emitting diodes (LED) may be disposed adjacent to the first and second sides of the light-guide plate 100 to generate light.

The display panel assembly 500 includes a display panel 510 for displaying an image and a driving circuit 520 driving the display panel 510.

The display panel 510 may include a first substrate 512, a second substrate 514 opposite the first substrate 512 and a liquid crystal layer (not shown) disposed between the first and second substrates 512 and 514.

For example, the first substrate 512 includes a TFT substrate having a plurality of thin-film transistors (TFT), which are switching elements, formed thereon. The TFTs are disposed in a matrix shape on the TFT substrate. The TFT includes a source terminal connected to a data line, a gate terminal connected to a gate line and a drain terminal connected to a pixel electrode including a transparent conductive material.

For example, the second substrate 514 includes a color filter substrate having red (R), green (G) and blue (B) color filters for displaying colors. The RGB color filters are formed on the color filter substrate in a form of a thin film. The second substrate 514 may further include a common electrode formed using a transparent conductive material. Alternatively, the first substrate 512 may include the RGB color filters formed thereon.

When a gate signal is applied to the gate terminal so that the TFT is turned on, a data signal is applied to the pixel electrode so that an electric field is formed between the pixel electrode and the common electrode. The electric field changes an arrangement of liquid crystal molecules in the liquid crystal layer. The arrangement of the liquid crystal molecules changes a transmittance of light passing through the liquid crystal layer so that the display panel 510 displays an image.

The driving circuit 520 may include a source printed circuit board (PCB) 522, a data driving circuit film 524 and a gate driving circuit film 526. The source PCB 522 generates various control signals. The driving circuit film 524 connects the source PCB 522 with the display panel 510. The gate driving circuit film 526 is connected to the display panel 510.

The data driving circuit film 524 is connected to the data line of the first substrate 512 and the gate driving circuit film 526 is connected to the gate line of the first substrate 512. The data driving circuit film 524 and the gate driving circuit film 526 include a driving chip. The driving chip generates a driving signal driving the display panel 510 in response to the control signals provided by the source PCB 522. For example, the data driving circuit film 524 and the gate driving circuit film 526 may include a tape carrier package (TCP) or a chip-on-film (COF). The driving circuit 520 may further include a gate PCB connected to the gate driving circuit film 526.

The display apparatus 600 may further include a reflective sheet 610 disposed under the light-guide plate 100. The reflective sheet 610 reflects light leaking from the lower surface of the light-guide plate 100 toward an interior of the light-guide plate 100. Therefore, the reflective sheet 610 may improve light use efficiency. For example, a material used for the reflective sheet 610 may include polyethylene terephthalate (PET), polycarbonate (PC), etc.

The display apparatus 600 may further include a diffusion sheet 620 disposed on the light-guide plate 100. The diffusion sheet 620 diffuses light emitted from the light-guide plate 100 to improve brightness uniformity.

According to the light-guide plate and the display apparatus having the light-guide plate of the present invention, first protrusion patterns are formed on a left portion of an upper surface of a base plate and second protrusion patterns are formed on a right portion of the upper surface of the base plate. The first protrusion patterns have a symmetrical shape to the second protrusion patterns. Exemplary embodiments of present invention may not include an optical sheet.

In addition, the density of each of the first and second protrusion patterns may be controlled according to the positions on the upper surface of the base plate. Therefore, the viewing angle and viewing properties may be improved.

The density of third protrusion patterns may be controlled according to the positions on a lower surface of the base plate. Therefore, brightness uniformity may be improved.

Having described exemplary embodiments of the present invention, it is noted that various changes, substitutions and alterations can be made herein without departing from the spirit and scope of the disclosure.

What is claimed is:

1. A backlight assembly comprising:
    a light source generating light; and
    a light-guide plate guiding the light, the light-guide plate comprising:
        a base plate having a light incident surface facing the light source and a light exiting surface disposed away from the light source as compared to the light incident surface;
        first protrusion patterns formed on a left portion of the light exiting surface of the base plate with respect to a central line of the light exiting surface, a cross-section of the first protrusion patterns having a trapezoidal shape, which has a top and a bottom substantially parallel with each other and first and second inclined sides inclined at different angles with respect to the bottom; and
        second protrusion patterns formed on a right portion of the light exiting surface with respect to the central line, a cross-section of the second protrusion patterns having a trapezoidal shape substantially symmetrical to the trapezoidal shape of the first protrusion patterns with respect to the central line, and disposed substantially symmetrical to the first protrusion patterns with respect to the central line.

2. The backlight assembly of claim 1, wherein each of the first protrusion patterns comprises:
    the first inclined side extended from the light exiting surface of the base plate and inclined toward the central line;
    the top extended from the first inclined side toward the central line, the top being substantially parallel with the light exiting surface of the base plate; and
    the second inclined side extended from the top to the light exiting surface of the base plate.

3. The backlight assembly of claim 2, wherein the first inclined side is inclined by about 30° to about 60° with respect to the light exiting surface of the base plate.

4. The backlight assembly of claim 2, wherein, among the first protrusion patterns, an angle between the first inclined side and the light exiting surface varies according to a distance from the central line.

5. The backlight assembly of claim 4, wherein the angle between the first inclined side and the light exiting surface increases as the distance from the central line increases.

6. The backlight assembly of claim 2, wherein the second inclined side is substantially perpendicularly extended to the light exiting surface of the base plate.

7. The backlight assembly of claim 2, wherein the second inclined side is inclined away from the central line.

8. The backlight assembly of claim 7, wherein an angle between the second inclined side and the light exiting surface is larger than an angle between the first inclined side and the light exiting surface.

9. The backlight assembly of claim 1, wherein each of the first protrusion patterns has a width of about 30 μm to about 100 μm.

10. The backlight assembly of claim 9, wherein each of the first protrusion patterns has a height of about 30 μm to about 100 μm.

11. The backlight assembly of claim 1, wherein the first protrusion patterns have variable widths according to a distance from the central line.

12. The backlight assembly of claim 11, wherein the widths of the first protrusion patterns increase as a distance from the central line increases.

13. The backlight assembly of claim 1, wherein the first protrusion patterns are spaced apart from one another by a predetermined distance.

14. The backlight assembly of claim 1, wherein a distance between adjacent first protrusion patterns is variable according to a distance from the central line.

15. The backlight assembly of claim 14, wherein the distance between adjacent first protrusion patterns increases as the distance from the central line increases.

16. The backlight assembly of claim 1, further comprising third protrusion patterns formed on the light incident surface of the base plate opposite the light exiting surface.

17. The backlight assembly of claim 16, wherein each of the third protrusion patterns has a cross-section of a triangular shape.

18. The backlight assembly of claim 17, wherein the third protrusion patterns are extended in a direction substantially perpendicular to an extending direction of the first and second protrusion patterns.

19. A backlight assembly comprising:
a light source generating light; and
a light-guide plate guiding the light, the light-guide plate comprising:
  a light incident surface facing the light source;
  a light exiting surface disposed away from the light source as compared to the light incident surface;
  a first protrusion pattern formed on a left portion with respect to a central line, the first protrusion pattern including a first inclined surface inclined toward the central line and having a cross-section of a trapezoidal shape, which has a top and a bottom substantially parallel with each other and a second inclined surface inclined by an angle different than the first inclined surface with respect to the bottom; and
  a second protrusion pattern formed on a right portion with respect to the central line, the second protrusion pattern including a first inclined surface inclined toward the central line,
  wherein the first inclined surface of the second protrusion pattern is substantially symmetrical to the first inclined surface of the first protrusion pattern with respect to the central line,
  wherein the first and second protrusion patterns are formed on the light exiting surface.

20. A backlight assembly comprising:
a light source generating light; and
a light-guide plate comprising:
  a base plate having a light incident surface facing the light source and a light exiting surface disposed away from the light source as compared to the light incident surface;
  first protrusion patterns formed on the light exiting surface of the base plate, the first protrusion patterns having a variable density according to a position on the light exiting surface of the base plate and a cross-section of a trapezoidal shape, which has a top and a bottom substantially parallel with each other and first and second inclined sides inclined by different angles with respect to the bottom; and
  second protrusion patterns formed on the light exiting surface, the second protrusion patterns having a variable density according to a position on the light exiting surface, a cross-section of a trapezoidal shape substantially symmetrical to the trapezoidal shape of the first protrusion patterns and disposed substantially symmetrical to the first protrusion patterns.

21. The backlight assembly of claim 20, wherein a density of the first protrusion patterns is substantially same as the density of the second protrusion patterns in a central portion of the light exiting surface of the base plate,
wherein the density of the first protrusion patterns disposed on a left portion of the light exiting surface of the base plate with respect to a central line and the density of the second protrusion patterns disposed on a right portion of the light exiting surface of the base plate opposite the left portion with respect to a central line of the light exiting surface increase as a distance from the central portion increases.

22. The backlight assembly of claim 21, wherein the density of the first protrusion patterns linearly decreases as a distance from a left side of the base plate increases, and the density of the second protrusion patterns linearly increases as the distance from the left side increases.

23. The backlight assembly of claim 21, wherein the density of the first protrusion patterns decreases in a form of an exponential function curve as a distance from a left side of the base plate increases, and the density of the second protrusion patterns increases in a form of the exponential function curve as the distance from the left side increases.

24. The backlight assembly of claim 21, wherein the density of the first protrusion patterns decreases in a form of a trigonometric function curve as a distance from a left side of the base plate increases, and the density of the second protrusion patterns increases in a form of the trigonometric function curve as the distance from the left side increases.

25. The backlight assembly of claim 21, wherein each of the first protrusion patterns comprises:
the first inclined side extended from the light exiting surface of the base plate and inclined toward a right direction;
the top extended from the first inclined side toward the right direction, the top being substantially parallel with the light exiting surface of the base plate; and
the second inclined side extended from the top to the light exiting surface of the base plate.

26. The backlight assembly of claim 25, wherein each of the second protrusion patterns comprises:

a third inclined side extended from the light exiting surface of the base plate and inclined toward a left direction opposite to the right direction;

a second top extended from the third inclined side toward the left direction, the second top being substantially parallel with the light exiting surface of the base plate; and a fourth inclined side extended from the second top to the light exiting surface of the base plate.

27. The backlight assembly of claim 26, wherein the first inclined side and the third inclined side are inclined by an angle of about 30.degree. to 60.degree. with respect to the light exiting surface of the base plate.

28. The backlight assembly of claim 26, wherein the second inclined side and the fourth inclined side are substantially perpendicular to the light exiting surface of the base plate.

29. The backlight assembly of claim 20, further comprising third protrusion patterns formed on a light exiting surface of the base plate opposite the light exiting surface.

30. The backlight assembly of claim 29, wherein the third protrusion patterns have a cross-section of a triangular shape when viewed in a longitudinal direction.

31. The backlight assembly of claim 28, wherein the third protrusion patterns are extended in a direction substantially perpendicular to an extending direction of the first and second protrusion patterns.

32. A display apparatus comprising:
a display panel; and
a light guide plate comprising:
 a first protrusion pattern having a cross-section of a trapezoidal shape which has a top and a bottom substantially parallel with each other and first and second inclined sides inclined by different angles with respect to the bottom; and
 a second protrusion pattern having a cross-section of an isosceles trapezoidal shape,
  wherein the first and second protrusion patterns are protruded toward the display panel.

33. A display apparatus comprising:
a light-guide plate including:
a base plate;
first protrusion patterns formed on a left portion of an upper surface of the base plate with respect to a central line of the upper surface, the first protrusion patterns having a cross-section of a trapezoidal shape, which has a top and a bottom substantially parallel with each other and first and second inclined sides inclined by different angles with respect to the bottom; and second protrusion patterns formed on a right portion of the upper surface with respect to the central line, the second protrusion patterns having a substantially symmetrical shape to the first protrusion patterns;

a lamp disposed adjacent to a side of the light-guide plate; and a display panel disposed on the light-guide plate, the display panel displaying an image using light passing through the light-guide plate.

34. A display apparatus comprising:
a light-guide plate including:
a base plate;
first protrusion patterns formed on an upper surface of the base plate, the first protrusion patterns having a variable density according to a position on the upper surface and a cross-section of a trapezoidal shape which has a top and a bottom substantially parallel with each other and first and second inclined sides inclined by different angles with respect to the bottom when viewed in a longitudinal direction of the first protrusion patterns; and second protrusion patterns formed on the upper surface, the second protrusion patterns having a variable density according to a position on the upper surface, a cross-section of a trapezoidal shape and disposed substantially symmetrical to the first protrusion patterns;

lamps disposed adjacent to sides of the light-guide plate; and a display panel disposed on the light-guide plate, the display panel displaying an image using light passing through the light-guide plate.

35. The display apparatus of claim 34, wherein a density of the first protrusion patterns is substantially identical to a density of the second protrusion patterns in a central portion of the upper surface,
wherein the density of the first protrusion patterns and the density of the second protrusion patterns increases as a distance from the central portion increases.

* * * * *